United States Patent
Howard, III et al.

(10) Patent No.: US 12,373,881 B1
(45) Date of Patent: Jul. 29, 2025

(54) CAR WASH POINT OF SALE SYSTEM AND MANUFACTURE

(71) Applicant: Autobell Car Wash, LLC, Charlotte, NC (US)

(72) Inventors: Charles A. Howard, III, Charlotte, NC (US); Stephen Phillips, Statesville, NC (US)

(73) Assignee: Autobell Car Wash, LLC, Charlotte, NC (US)

( * ) Notice: Subject to any disclaimer, the term of this patent is extended or adjusted under 35 U.S.C. 154(b) by 170 days.

(21) Appl. No.: 17/701,082

(22) Filed: Mar. 22, 2022

Related U.S. Application Data (60) Provisional application No. 63/164,748, filed on Mar. 23, 2021.

(51) Int. Cl.
*G06Q 30/00* (2023.01)
*G05B 15/02* (2006.01)
*G06Q 30/0601* (2023.01)

(52) U.S. Cl.
CPC ......... *G06Q 30/0641* (2013.01); *G05B 15/02* (2013.01)

(58) Field of Classification Search
CPC ..... G06Q 30/0601–0645; G06Q 30/08; G05B 15/02
USPC ................................................ 705/26.1–27.2
See application file for complete search history.

(56) References Cited

U.S. PATENT DOCUMENTS

| | | | |
|---|---|---|---|
| 11,443,260 B1 * | 9/2022 | van Breen | G08G 1/095 |
| 2010/0194597 A1 * | 8/2010 | Ness | G08G 1/0175 |
| | | | 340/988 |
| 2012/0253973 A1 * | 10/2012 | Harter | G06Q 20/3224 |
| | | | 455/456.3 |
| 2014/0074605 A1 * | 3/2014 | Sanchez | G06Q 40/03 |
| | | | 705/14.64 |
| 2014/0180852 A1 * | 6/2014 | Kamat | G06Q 20/3224 |
| | | | 705/16 |
| 2015/0032558 A1 * | 1/2015 | Bonk | G06Q 20/202 |
| | | | 705/21 |
| 2017/0262814 A1 * | 9/2017 | Brockman | G06Q 10/20 |

(Continued)

OTHER PUBLICATIONS

PCD Staff, First self-serve carwash in North America to use mobile phone payment method, Aug. 18, 2016, Carwash.com, accessed at [https://www.carwash.com/first-self-serve-carwash-mobile-phone-payment/] (Year: 2016).*

*Primary Examiner* — Jeffrey A. Smith
*Assistant Examiner* — Lindsey B Smith
(74) *Attorney, Agent, or Firm* — Nelson Mullins Riley & Scarborough LLP (57) ABSTRACT

A system for use with a car wash is provided having wash equipment and a site module. The site module is configured to send and receive signals with the wash equipment. The system further has a gate and at least one sign comprising a graphical code. The at least one sign is provided in front of the gate, and the at least one graphical code is configured to be scanned by a customer device to indicate the location of the customer device. The system is configured to send and receive signals with an application on the customer device. The site module is also configured to receive the desired property of the wash, and the site module is configured to provide commands to the one or more wash equipment to initiate the wash based on the desired property of the wash.

21 Claims, 6 Drawing Sheets

(56) References Cited

U.S. PATENT DOCUMENTS

2018/0108051 A1\* 4/2018 Rygiel ................ G06Q 50/167
2021/0150499 A1\* 5/2021 Fazio ...................... G07F 17/20

\* cited by examiner

CAR WASH POINT OF SALE SYSTEM AND MANUFACTURE

CROSS-REFERENCE TO RELATED APPLICATION

This application claims priority from U.S. Provisional Patent Application No. 63/164,748, filed on Mar. 23, 2021, in the United States Patent and Trademark Office. The disclosure of which is incorporated herein by reference in its entirety.

FIELD OF THE INVENTION

The present invention relates to a point of sale system and method, more particularly to a point of sale system and method for use at a car wash.

BACKGROUND OF THE INVENTION

Current car wash Point of Sale ("POS") systems often consist of automated checkout terminals located in the drive-up lanes of the car wash location with which the customer interacts to select and pay for a car wash before being allowed to proceed by a mechanical gate. Alternatively, POS systems often consist of manned POS terminal where the customer is required to interact with an employee to select and purchase a wash. The limitations of these systems include high equipment and software costs, significant labor costs, low throughput and high infectious transfer risk, all leading to customer dissatisfaction and reduced sales. Automated checkout terminals average between $75,000 and $80,000 per lane, and cost per location for manned POS terminals can reach $100,000. These POS systems typically require significant software licensing, which increases costs in each car wash location by several thousand dollars per year. Labor hours are required for manned POS terminals and for maintenance of automated ones. Further, manned POS terminals cause bottlenecks and delays because there is generally only one lane due to doubling of labor costs if a second lane is added. For automated terminals, because not every customer is comfortable with the interfaces of the automated terminals and because customers generally do not interact with them on a high frequency basis, the average individual transaction time tend to be very high at these terminals. To reduce the wait time there are usually multiple lanes at these types of locations, which significantly increases cost. Since the automated terminals require customers to touch frequently contacted public surfaces and since manual terminals require direct customer/employee interaction, both options increase the risk of infectious transfer. Further, fraudulent devices may be implemented on these terminals to steal financial or personal information from the user. Thus, improved systems are desired that address these concerns.

SUMMARY OF THE INVENTION

The present invention relates to a point of sale system that addresses some or all of the concerns noted above. Embodiments described herein provide a cost-effective system for a car wash location that allows a customer to make selections and purchases without interacting with onsite hardware or employees while increasing wash throughput and customer satisfaction.

Embodiments of the present invention may improve the operation of car washes in several ways. Embodiments may result in reduced wait times, increased comfortability, and increased safety, which may increase customer satisfaction and increase profits.

In an aspect of the invention, a system is provided having an automated, customer-centered POS solution for a car wash. The term "car", as used herein, generally refers to any type of automobile or vehicle.

In an aspect of the invention, the system can be completely touchless, with the only customer interaction in the wash selection and purchase process being with a customer device such as a mobile phone of a customer. Customers may use their customer device to scan a graphical code at one or more locations, minimizing or eliminating the need for the customer to interact with any physical terminal.

Advantageous features of the invention include, but are not limited to, increased throughput such as by increasing the number of cars that may move through the car wash per hour. This increased throughput may be provided by allowing a customer to input selections on his or her own customer device. Most customers operate their customer devices and any applications on their customer devices very frequently, making the customers efficient and comfortable in using their own customer devices. By contrast, most customers interact with physical checkout terminals at a car wash or in another similar environment very infrequently, making customers inefficient in their use of these terminals and increasing the frustration for the customers. This may increase the efficiency of systems as a whole, allowing increased throughput.

Another advantage of the system and method of the present invention is a reduced upfront cost for equipment and a reduced recurring cost for maintenance and cleaning of any equipment. This solution eliminates the need for a touch terminal at the gate, thereby eliminating the need for maintenance and cleaning of that equipment.

Another advantage of the system of the invention is that it permits a customer to initiate and complete a purchase interaction without making any contact with surfaces on the premises. This may increase the comfort level of customers and result in an increased number of customers over time. Further, this reduces the number of touch surfaces that are frequently contacted by customers, reducing the costs of cleaning.

By utilizing a customer mobile device instead of a terminal, the complexity of systems may be reduced. Further, embodiments may be far simpler to setup and manage. Where a customer device is used, a customer may simply download a computer application on the customer device, and a software update may be provided automatically to the customer device to perform any necessary updates. By contrast, updates to existing terminals may require an employee or a contractor to travel to the site where a terminal is located to perform the necessary updates, and these updates may be carried out inconsistently from site to site.

In some embodiments, customers will interact with a Progressive Web Application ("PWA") rather than installing the app. In these embodiments, there will be no updates required to the customer device. A graphical code may be provided on site that the customer may scan. Upon successfully scanning the graphical code, the PWA may be opened, and the customer may select their wash preferences and input any necessary financial information to complete the transaction.

Furthermore, the present invention provides for ease of scalability for adding car wash locations. Computer systems may adapt to the addition of new sites with minimal additional equipment needed at each site.

One or more gates may also be provided. In some embodiments, two physical queues of cars may initially be provided, and these queues may merge into a single queue. As such, issues may arise in determining the order of vehicles to ensure that the actual wash matches the customer's selected preferences. Even where a single queue is maintained at all times, the order of vehicles may be altered by cars exiting the line due to an emergency, due to a vehicle being too large to fit through the tunnel, etc. To verify the order of vehicles, one or more graphical codes may be provided. These codes may be provided, by way of example, just before the entrance of the tunnel. The customers may be required to scan the code to indicate that they are at the tunnel entrance, which will verify the customer. Scanning the code may also open a gate to allow the customer to enter the tunnel as well. This approach may reduce the need for customers to contact any surfaces, and it may also eliminate the need for an employee to constantly monitor the order of vehicles.

The system and method of the present invention may be suitable for a point of sale system in other industries.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein.

DESCRIPTION OF THE PREFERRED EMBODIMENTS

The following description of the embodiments of the present invention is merely exemplary in nature and is in no way intended to limit the invention, its application, or uses. The following description is provided herein solely by way of example for purposes of providing an enabling disclosure of the invention, but does not limit the scope or substance of the invention.

Further, the term "or" as used in this disclosure and the appended claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in," "at," and/or "on," unless the context clearly indicates otherwise. The phrase "in one embodiment," as used herein does not necessarily refer to the same embodiment, although it may.

Embodiments of the present invention may provide a customer centered POS solution for carwashes. The systems can be completely touchless, eliminating the need for customers to interact face-to-face with on-site employees.

Figure 1:
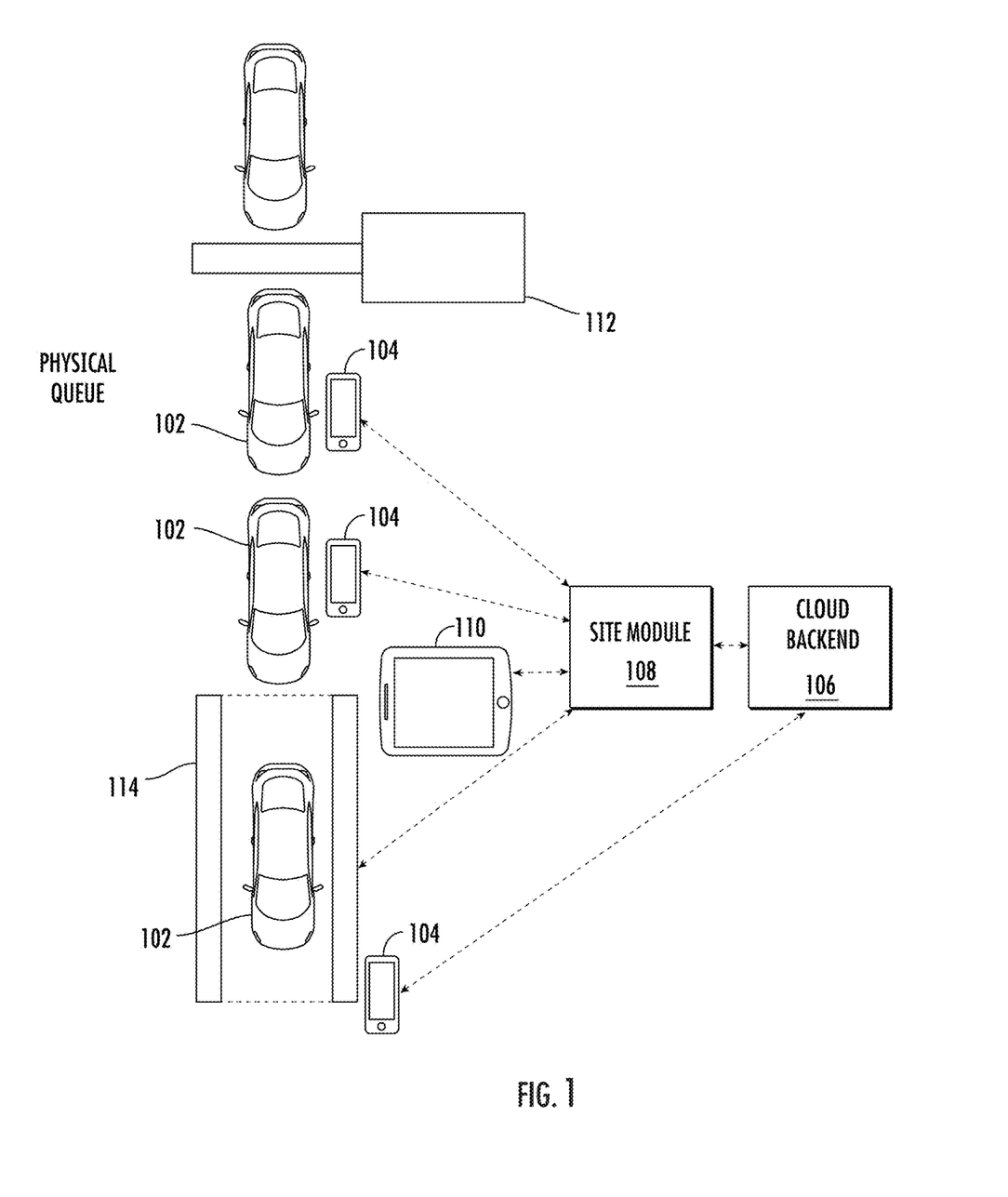
FIG. 1 is a schematic representation of a car wash environment, in accordance with an embodiment of the present invention.

FIG. 1 is a schematic representation of a car wash environment, in accordance with an embodiment of the present invention. A customer computer application may be used in some embodiments. This application may be provided on a computer-based device 104 of a customer. In FIG. 1, the customer device 104 is presented as a cellular phone. However, the operating system within a car 102 itself may also serve as a customer device, or the customer device may take another form such as a computer, a tablet, a smartwatch, etc. However, other customer devices may be used as well. The customer application may be provided as an Android or iOS native application. The customer application may allow a customer to make a single purchase wash selection and pay for it or redeem a plan based wash. They may also purchase extras on any wash. The various applications are communicatively connected and may communicate with each other via an Application Programming Interface ("API") and/or the cloud backend 106, or the applications may communicate through some other interface.

A progressive web application ("PWA") may be used in some embodiments. The PWA may be provided on a customer device 104, and the PWA permits a customer to select and pay for a wash and extras without downloading a customer application. These PWAs may be delivered through the web and built using web technologies like CSS, JavaScript, and HTML. This PWA may serve as an alternative to the application, and the PWA may be used in instances where a customer has not downloaded the application.

A site module 108 may be provided. This site module 108 serves as the interface between the cloud backend 106 and the car wash hardware and equipment. For example, site module 108 may connect with the one or more gates 112 and various other pieces of hardware and equipment within a tunnel 114 to provide commands. Site module 108 may also connect with hardware and equipment for extra services where these extra services are available at a wash location. Site module 108 may control any gates 112 and may control car wash services based on selections made by customer. Site module 108 is configured to receive signals from these various hardware components and communicate these to customer device 104 via a cloud backend 106. In some embodiments, a tunnel controller may be provided to control the operation of hardware within the tunnel, and this tunnel controller may be separate from the site module 108. Separating the site module 108 from the tunnel controller may be beneficial as a tunnel controller may be made by another manufacturer, and the use of a separate site module 108 may be configured to operate with any type of tunnel controller.

Dashed lines within FIG. 1 are intended to illustrate lines of communications between various components. These lines of communication may take various forms. For example, the lines of communication may be a physical, wired connection. Alternatively, the lines of communication may be formed wirelessly, and this may be done through various approaches. For example, wireless connections may be formed through Bluetooth, through radio-frequency communication, through an API, etc. Furthermore, references to signals being sent are intended to include signals that are transmitted wirelessly as well as any signals that a sent via a physical, wired connection. A radio-frequency transceiver may be provided within a site controller to connect with the cloud backend 106 and other hardware and devices.

A loader application 110 may also be provided to manage the queue of cars flowing into the physical wash. The loader application 110 may serve as an employee interface. This loader application 110 may also manage cash payments in the event that the customer is not using a credit or debit card or a digital wallet such as Apple Pay or Google Pay. The loader application 110 may connect directly to site module 108, or loader application 110 may connect instead to cloud backend 106 directly.

Cloud backend 106 may be configured to receive and send data to and from applications. Cloud backend 106 may house the database and code that manage the operation of the applications and site module 108. Specifically, cloud backend 106 may house customer data, location data, sales items, prices, tax information, queues, sales transactions, among others. Some or all of the information stored within cloud backend 106 may be stored securely, and this may be especially important for financial and personal information from specific customers. Cloud backend 106 may comprise various types of computer systems. In some embodiments, cloud backend 106 may comprise a single server, and in other embodiments, cloud backend 106 may comprise several servers that are connected together, either by wired connection or wireless connection.

While hardware will be required for the wash, the need for other hardware may be minimized. For example, hardware for the payment and hardware for receiving the customers preferences for a wash may be minimized or eliminated altogether. One or more gates 112 may be provided. For example, a Magnetic Parking Pro-RCB1020 gate may be used. Gates may be used to control the flow of traffic in an orderly manner. The use of these gates may ultimately improve throughput. A network to digital relay board may also be used. For example, a Denkovi DAE-PB-RO12-12V/DI8/AI8+DAEnetIP4 board may be used.

Figure 2:
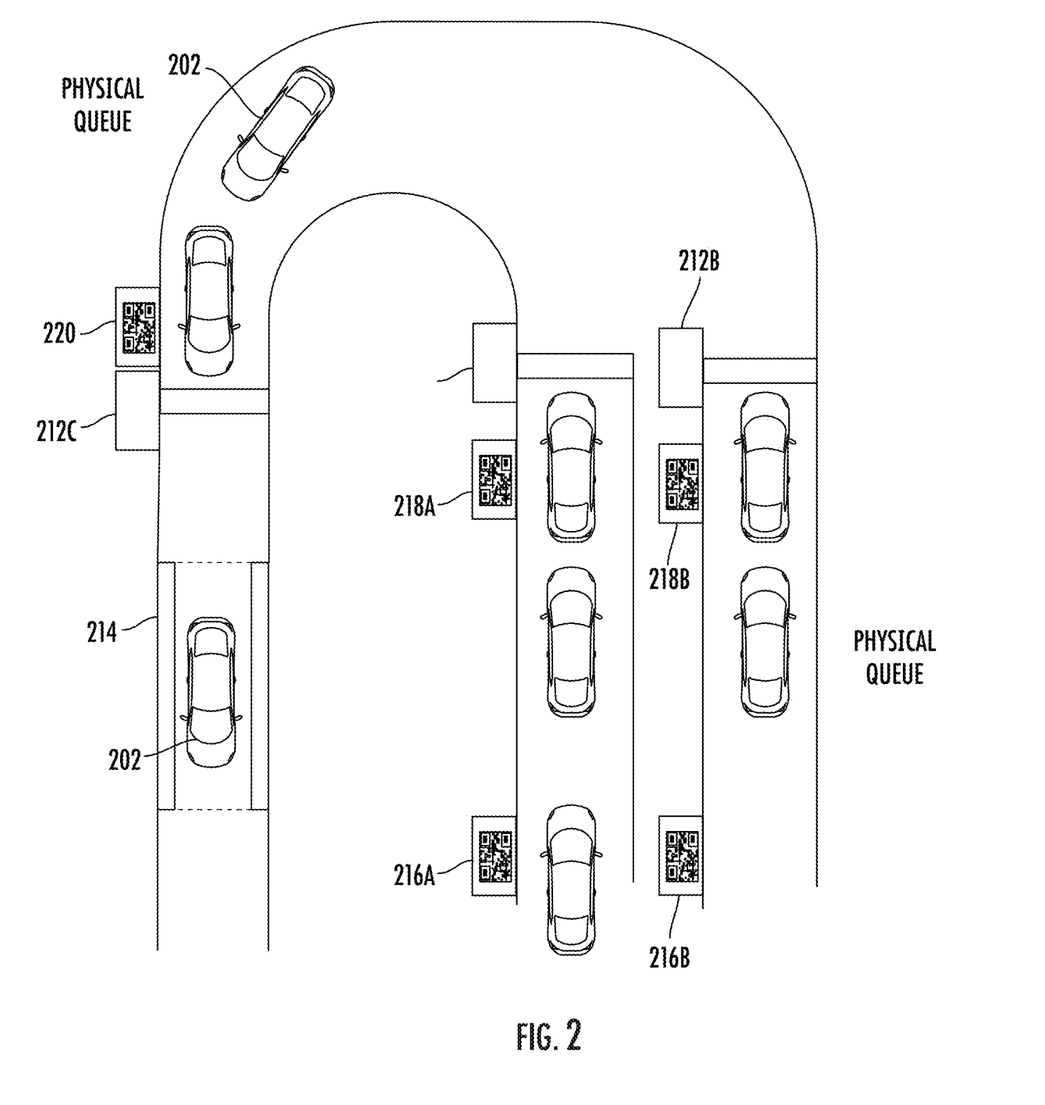
FIG. 2 is another schematic representation of car wash environment, in accordance with an embodiment of the present invention.

FIG. 2 illustrates another schematic view of a car wash environment in one embodiment. Dotted lines illustrate the lanes in which the physical queue of cars may accumulate within. As illustrated, one or more signs 216A, 216B, 218A, 218B, 220 may be provided at various locations within the car wash environment. These signs may possess a graphical code that can be scanned by the customer device 104. Signs 216A, 216B may be provided for customers that wish to use the PWA. A customer may scan the graphical code presented to open the PWA, and then the customer may make selections for his or her wash. Signs 216A, 216B are illustrated as being provided next to the physical queue of cars. However, these signs 216A, 216B may be provided in other locations, such as in the parking lot.

Signs 218A and 218B may provide graphical codes that may be scanned to indicate the presence of a customer at the gate 212A and 212B respectively. After scanning the graphical code, the customer may be prompted to wait momentarily until other cars move forward, or the gate may open automatically. In some embodiments, the gate will only open if the user has completed the transaction on the PWA or on the application before scanning the graphical code.

Signs 220 may provide graphical codes that may be scanned to indicate the presence of a customer at the gate 212C. After scanning the graphical code, the customer may be prompted to wait momentarily until other cars move forward. By using signs 218A, 218B, 220, the systems may effectively keep track of the order of cars to ensure that a customer's wash matches with his or her selected preferences.

FIGS. 3-6 illustrate various flow charts used to describe a method for operating an example system in accordance with the present invention. These figures illustrate various rows for different systems or applications. These systems and applications may include a cloud backend 106, a customer application, a PWA, a loader application 110, and a site module 108. These systems and applications may collectively perform the tasks illustrated in the flow charts presented in FIGS. 3-6. While FIGS. 3-6 show that a specific system or application performs certain tasks, it should be understood that these tasks may be performed by another system or application unless indicated otherwise.

Figure 3:
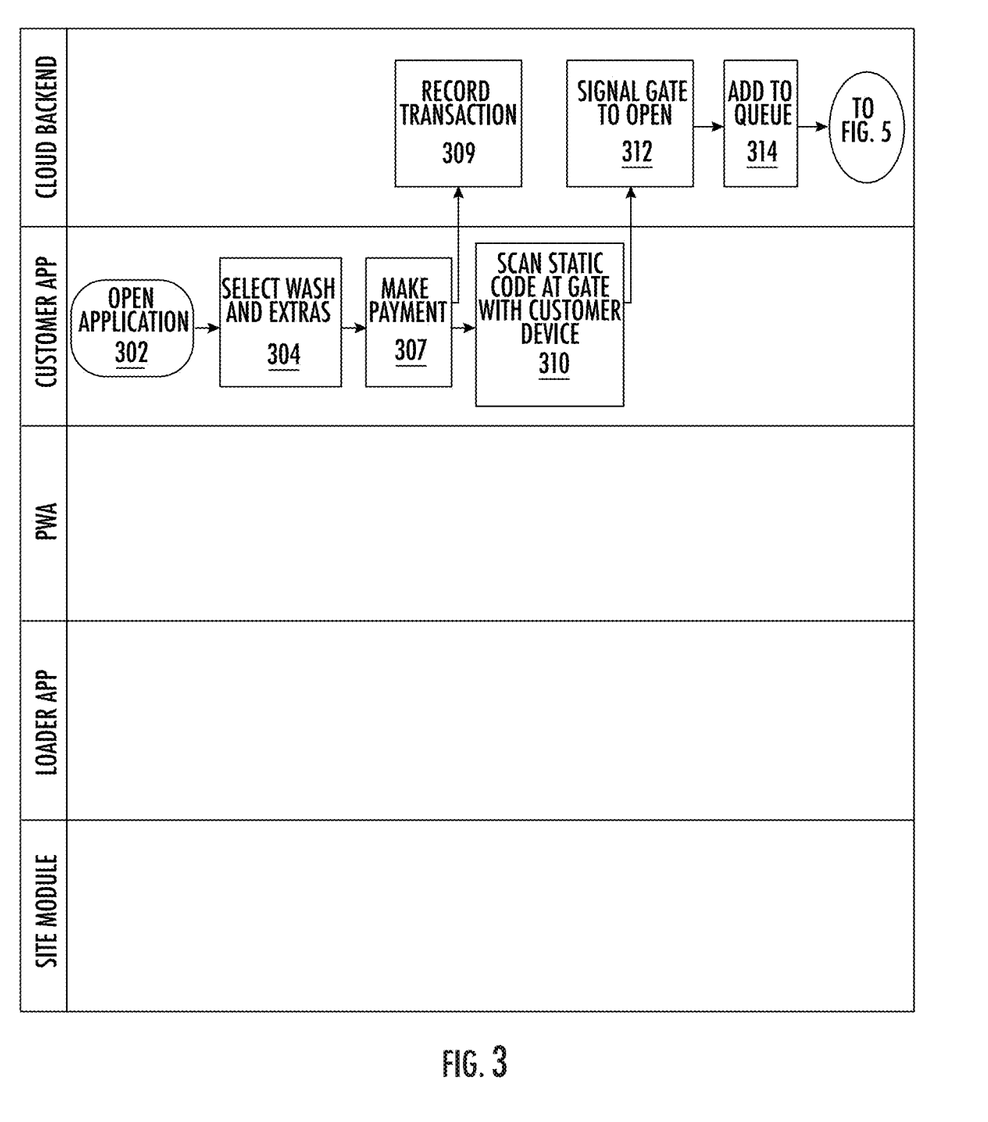
FIG. 3 is a flow chart illustrating a method for operating an example system where a customer computer application and/or device is used, in accordance with an embodiment of the present invention.

FIG. 3 is a flow chart illustrating a method for operating an example system where a customer application is used, in accordance with an embodiment of the present invention. The customer may initiate the process at operation 302 by opening an application on his or her customer device 104 (FIG. 1). The customer may open the app and make selections before reaching a gate 212A, 212B, and, in some embodiments, the customer may make selections before ever arriving at the car wash location.

When the customer opens the application and is not logged in, the customer may be prompted to create a new account. Where the customer has already created an account, the customer may be prompted to sign in to his or her account, or the customer may be automatically be logged into his or her account in some embodiments. The application may allow the customer to input and save their necessary information, and their financial information may be saved securely so that it may be readily used in subsequent transactions.

At operation 304, a customer may be prompted to select the wash type and extra options. The application may present various wash types and extra options that the customer may select from. In some embodiments, previously selected wash types and options may be saved so that the customer may quickly select their previous selection at operation 304. This data may be saved within the customer application itself, within memory at site module 108, or within memory associated with cloud backend 106, and the data may be saved at additional locations as well. Once the customer has input the selections, these selections may be sent to cloud backend 106 and/or site module 108, and the selections may be saved in memory in some embodiments.

At operation 307, the customer may be prompted to make a payment, and the customer may do so by inputting necessary information into input fields provided on the display. The customer may be prompted to select his or her preferred method of payment. Where the customer chooses to pay by credit or debit card, the customer may provide their credit or debit card information, and this information may be saved securely to the system. In some embodiments, financial information that was previously utilized on the customer device may be automatically inserted into the various input fields on the display, and the customer may verify this information before submitting it. Where previously saved financial information is used, the system may prompt a customer to provide the zip code or the Card Verification Value ("CVV") to protect the financial information. Alternatively, verification may utilize a retinal scanner, a thumbprint, a fingerprint, or a passcode to verify that the owner of the customer device is the person making the transaction. By having the transactions largely conducted on the customer device, the risk of information being stolen at a physical terminal through the use of a fraudulent device can be eliminated.

At operation 307, a customer may be prompted within the application to make a payment. The customer may then input his or her desired payment method and complete the payment. Once it is determined that sufficient payment was provided, then the customer application may communicate with cloud backend 106, and cloud backend 106 may record the transaction information at operation 309.

In some embodiments, after a payment has been made at operation 307, the customer may be permitted to proceed forward to a gate. At operation 310, the customer may scan this static or graphical code with his or her customer device. The graphical code may take the form of a QR code that may be scanned, but this code may also take some other form. This code may be provided as a static code or a graphical code at sign 220 (FIG. 2). By scanning this code, the customer may confirm that he or she is in the car currently waiting at the front of the physical queue of cars waiting at the gate 212C.

Once the code has been scanned at operation 310, a signal may be sent for the gate 212C to be opened at operation 312. At operation 314, the customer is added to a queue. In some embodiments, this queue may simply indicate the position of the car in a single line. However, in other embodiments, one or more queues may be provided for various services, and the customer may be added to the appropriate queue based on their selections and based on their automobile type. For example, two different wash tunnels may be provided in some embodiments that may accommodate different sized cars or automobiles. Other factors may also be considered. The process may then proceed to the flow chart presented in FIG. 5. Operation 314 may occur simultaneously with or even before operation 312.

Figure 4:
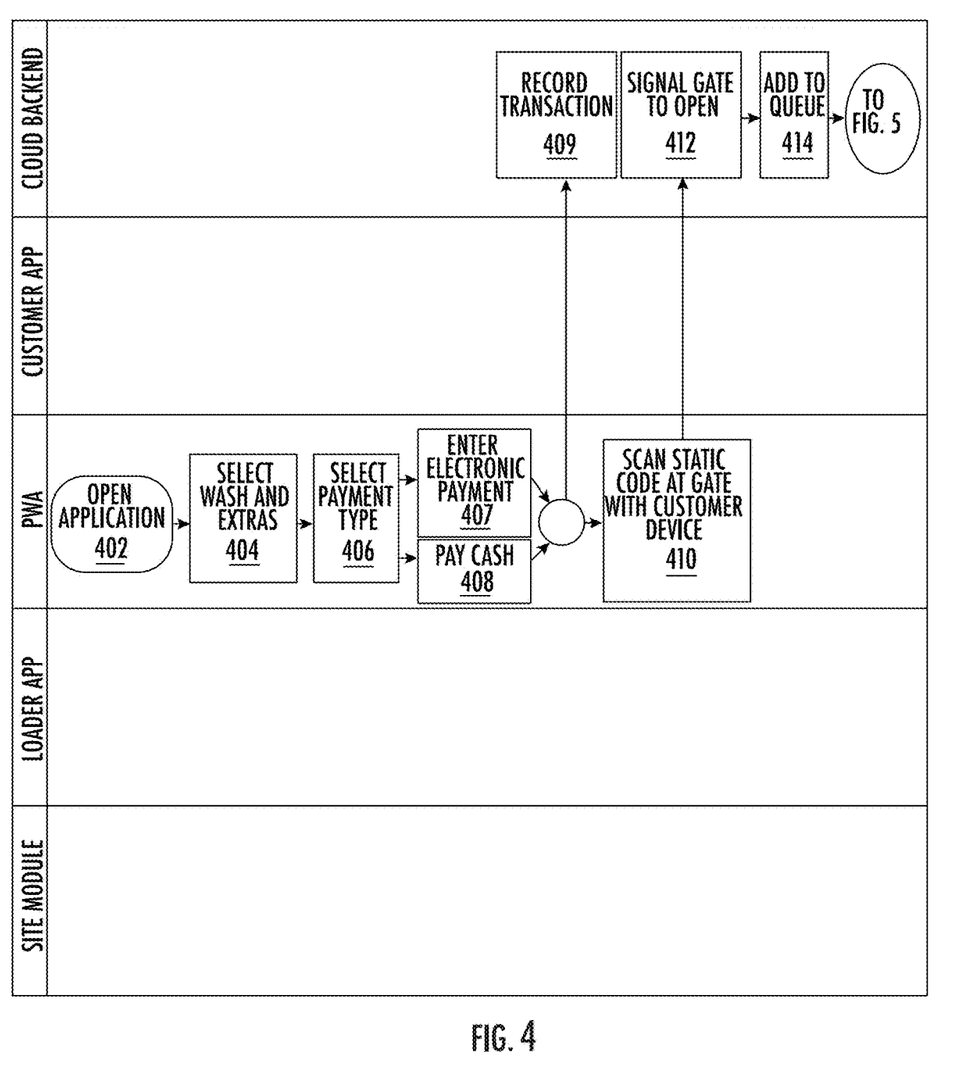
FIG. 4 is a flow chart illustrating a method for operating an example system where a PWA is used, in accordance with an embodiment of the present invention.

FIG. 4 is a flow chart illustrating a method for operating an example system where a PWA is used, in accordance with an embodiment of the present invention. The PWA may be used as an alternative to the customer application, and FIG. 4 is provided as an alternative approach to the one presented in FIG. 3. The PWA may function similarly to the customer application in several respects. Further, like number labels presented in FIGS. 3 and 4 (e.g. operation 302 and operation 402) are intended to represent similar operations. The discussion above for FIG. 3 is intended to apply for FIG. 4 unless otherwise noted.

At operation 402, the application may be opened, and this may be done by a customer scanning a graphical code at sign 216A or 216B. However, the PWA may be opened in other ways. At operation 404, the PWA may prompt the customer to provide a selection of the wash type and extra options, and the PWA may be configured to receive an input of the customer's selection. At operation 406, the PWA may be configured to provide a prompt to the customer to indicate their desired payment type, and, upon the customer selection of the payment type, the PWA may receive this selection.

Depending on the selected payment type at operation 406, the process may proceed to either operation 407 or operation 408. At operation 407, electronic payment may be entered via credit, debit card, or an E-Wallet such as Apple Pay or Google Pay. Alternatively, at operation 408, the customer may indicate that he or she wishes to pay using cash. Where this is done, the actual payment may be collected at a later operation (see operation 512 in FIG. 5). Once the payment information is authorized, the transaction information may be recorded in memory at operation 409 and the process may proceed to operation 410. This transaction information may be recorded in memory located in cloud backend 106 or at some other location.

At operation 410, a code may be provided at a gate or at some other location. This may be done in various ways, as discussed above in the context of operation 310 in FIG. 3. Once this code is received by the PWA, the PWA may send a signal to the cloud backend 106. Then, at operation 412, the cloud backend 106 can send a signal to the site module 108 so that a gate may open. At operation 414, the customer or the car may be added to the queue. Alternatively, the PWA may communicate directly with the site module 108 rather than sending a signal indirectly via the cloud backend 106.

Figure 5:
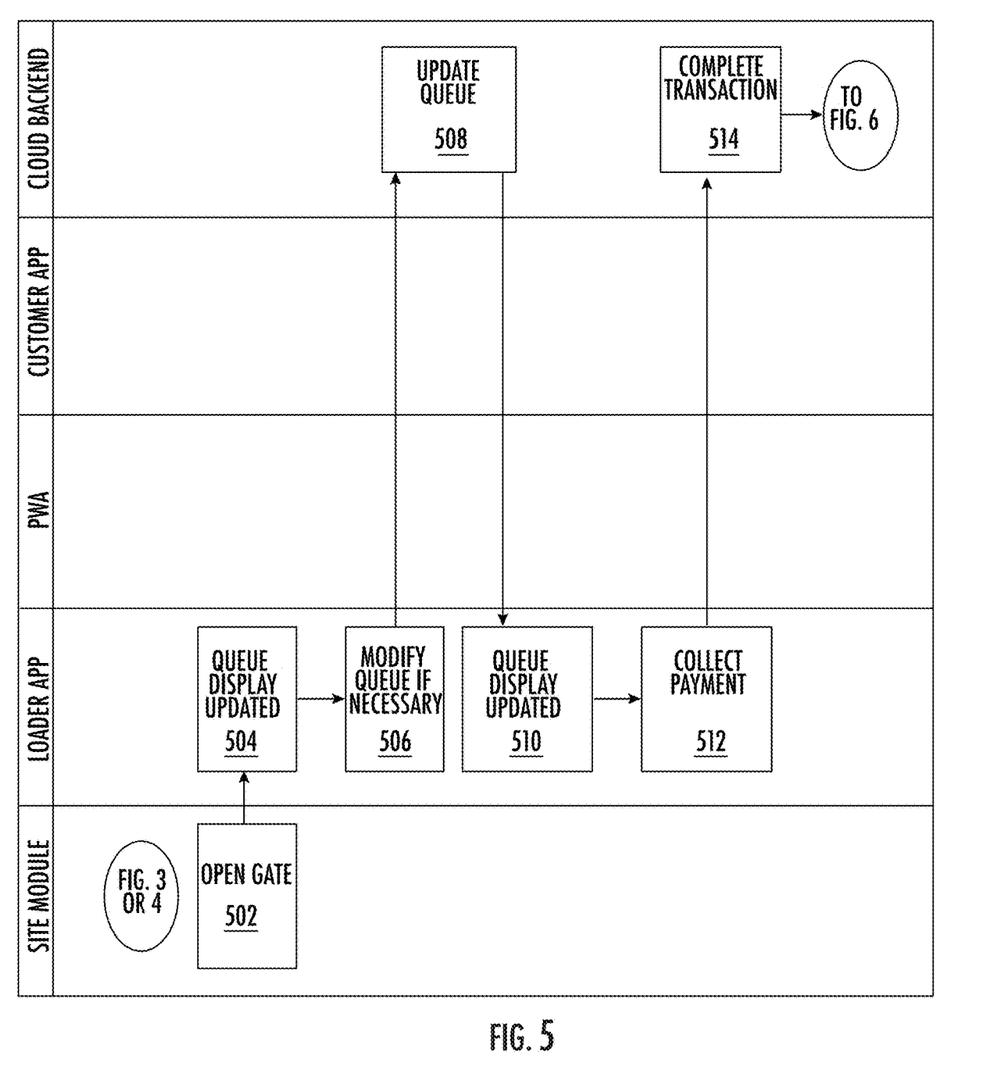
FIG. 5 is a flow chart illustrating a method for operating an example system, in accordance with an embodiment of the present invention.

FIG. 5 is a flow chart illustrating a method for operating an example system, in accordance with an embodiment of the present invention. This process may begin in the bottom left-hand corner of FIG. 5. At operation 502, a gate is opened. This may be done after the signal sent at operation 312 or 412 is received at site module 108 and/or at gate 112. At operation 504, the queue display may be updated at the loader application 110, and, in some instances, the queue may be modified at operation 506 if necessary. This may occur, for example, where an emergency occurs or where a vehicle is too large to fit inside a wash tunnel. At operation 508, a signal may be sent from the loader application 110 to cloud backend 106 to update the queue accordingly based on the changes at operation 504 and/or 506, and the queue display may be updated again at operation 510 if necessary.

At operation 512, payment may be received for some or all of the provided services (if it has not already been received). Payment may be received at operation 512 where a customer using the PWA indicated their desire to pay using cash at operation 408 (FIG. 4). In some embodiments, customers may be required to make payment for all services at operation 307 (FIG. 3) or operation 407 (FIG. 4). Then, at operation 514, the transaction may be completed.

Figure 6:
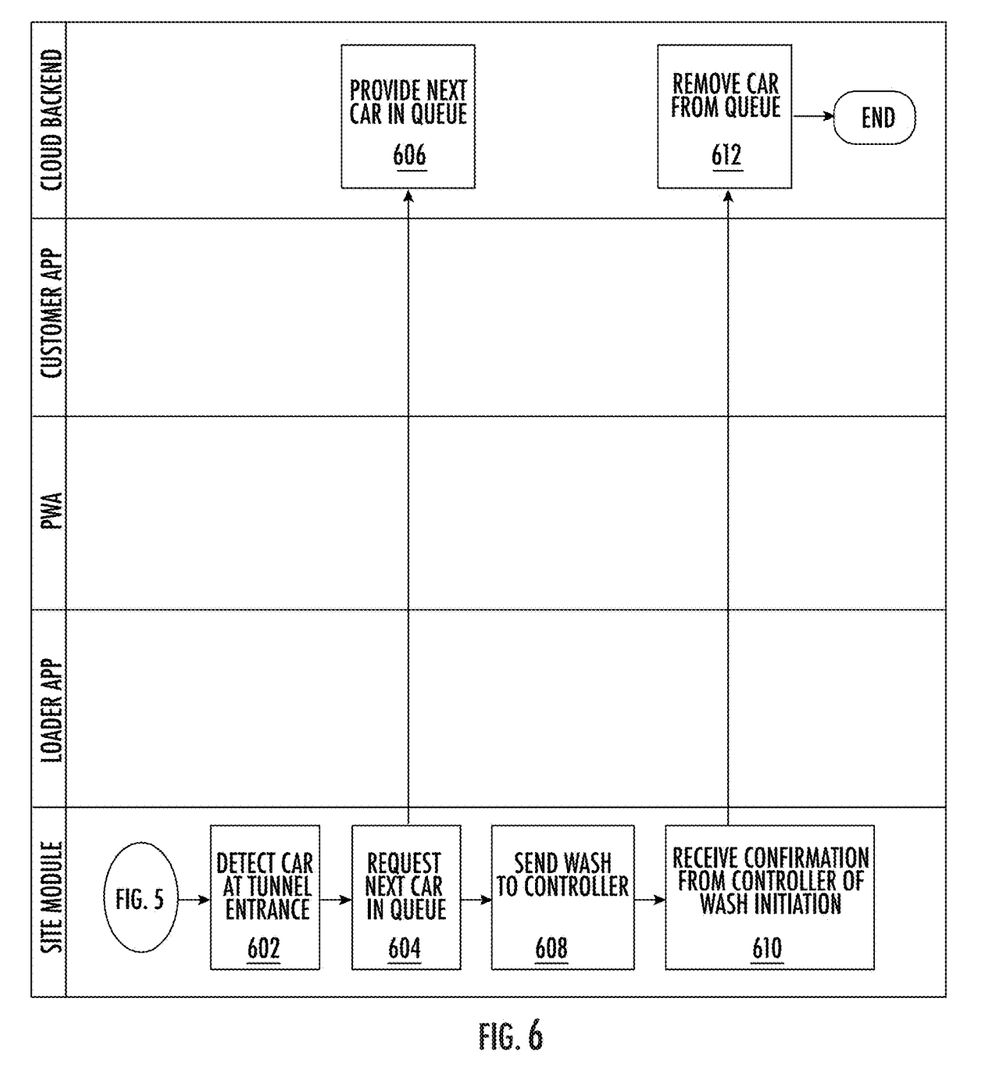
FIG. 6 is a flow chart illustrating a method for operating an example system, in accordance with an embodiment of the present invention.

FIG. 6 is a flow chart illustrating a method for operating an example system, in accordance with an embodiment of the present invention. At operation 602, car 102 may be detected at the entrance of the wash tunnel. To accomplish this, a graphical code may be provided on a sign 220, and the user may scan this code in the PWA or the computer application to indicate their presence at the gate. In some embodiments, a sensor may be provided to detect automobile 102 in that position. This sensor may take the form of a position sensor, a camera with associated image recognition techniques, a contact sensor, etc. Alternatively, automobile 102 or another customer device within automobile 102 may form a wireless connection, either directly or indirectly, with site module 108, and this connection may be used to communicate information about the position of automobile 102. Other approaches for detecting automobile 102 at gate 112 may also be used.

At operation 604, site module 108 may send a signal to cloud backend 106 to provide the next car 102 alongside the details for that next car 102 in the queue at operation 606. These details may include the customer's selections. At operation 608, site module 108 or a controller within site module 108 may signal the wash tunnel controller to cause the wash to begin within the wash tunnel. This wash may occur according to the customer's selections. Upon the initiation of the wash, site module 108 may receive confirmation from the controller of the wash initiation at operation 610. The car 102 may then be removed from the queue at operation 612.

Customer devices 104 may communicate with site module 108, cloud backend 106, loader application 110, gate 112, etc., through the use of any wireless communication technology. For example, customer devices 104 may form a connection via BlueTooth, BlueTooth Low Energy ("BLE"), Wi-Fi, radio-frequency signals, Cellular Data such as LTE or 5G, etc. However, other wireless communication technology may be used to form a connection.

Embodiments may include encryption techniques to increase the safety of any communications between customer device 104 and any of the systems described herein. Such encryption techniques and other approaches may be critical to maintain confidentiality of any personal information or financial information of the customer.

While the figures included herein are described as being performed in a specific order, it should be understood that operations may be performed in a different order without departing from the scope of the invention unless indicated otherwise. For example, an operation may be performed before, after, or simultaneously with another operation unless indicated otherwise. Additionally, additional operations may be performed in some embodiments, or operations may be omitted. Further, the operations described herein and illustrated in the figures may generally be performed by other systems—for example, the certain operations shown as being executed by site module 108 may be performed by other systems such as cloud backend 106 or a server located at cloud backend 106 in some embodiments.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system for use with a car wash, the system comprising:
    wash equipment;
    a gate;
    a site module comprising a memory device and a controller, wherein the site module is configured to send and receive signals with: i) a mobile device; ii) the wash equipment to control the operation of the wash equipment; and iii the gate to control the operation of the gate;
    a first sign comprising a first graphical code, the first graphical code being configured to be scanned by the mobile device;
    a second sign comprising a second graphical code, wherein the second sign is provided in front of the gate, the second graphical code being configured to be scanned by a the mobile device to indicate a location of the mobile device, and the second sign is not configured to receive any input from a customer;
    wherein the site module is configured to;
        send and receive signals with an application on the mobile device in response to the first graphical code being scanned by the mobile device;
        receive a customer selection of a desired property of a wash from the mobile device and not from a fixed, physical terminal;
        receive a location indication of the mobile device in response to the second graphical code being scanned by the mobile device; and
        provide commands to the wash equipment to initiate the wash based on the desired property of the wash and the location indication;
    wherein the system is configured to eliminate a need for the customer to make contact with the wash equipment, the gate, the site module, and the signs, the system is configured to cause the gate to open and cause activation of the wash equipment based on receipt of the location indication, and the wash equipment is operated based on the customer selection.

2. The system of claim 1, wherein the application is a progressive web application.

3. The system of claim 1, wherein the application is a computer application.

4. The system of claim 1, wherein the system is deployed in a car wash environment where two or more physical queues of cars are required to merge into a single physical queue of cars, the two or more physical queues of cars including a first queue, the first sign comprising the first graphical code is positioned adjacent to the first queue, the first graphical code configured to be scanned to indicate a correct order of cars in the first queue, the second sign comprising the second graphical code is positioned adjacent to the single physical queue of cars, and the second graphical code being configured to be scanned to indicate a correct order of cars in the single physical queue of cars.

5. The system of claim 4, wherein the second graphical code is a QR code.

6. The system of claim 1, wherein the mobile device is a mobile phone.

7. The system of claim 1, further comprising:
    a cloud backend comprising at least one server, the cloud backend being configured to send and receive signals with the site module, wherein the cloud backend is configured to send and receive signals with the application on the mobile device, the cloud backend is configured to receive a customer selection regarding the desired property of the wash, and the cloud backend is configured to send the customer selection regarding the desired property of the wash to the site module.

8. The system of claim 1, further comprising a loader application, the loader application being configured to send signals to and receive signals from the site module, and the loader application being configured to send commands for the operation of the gate and the wash equipment based on the customer selection regarding the desired property of the wash.

9. The system of claim 1, wherein communications between the site module and the mobile device are encrypted.

10. The system of claim 1, wherein the second graphical code is configured to be scanned to indicate that a vehicle of the customer is positioned proximate to the gate, wherein the site module is configured to receive an indication that the second graphical code has been scanned and to cause a wash to be initiated for the vehicle of the customer.

11. The system of claim 10, wherein the site module is configured to cause the wash to have wash properties based on customer selections received at the mobile device.

12. The system of claim 10, wherein the site module is configured to cause the wash to be initiated for the vehicle of the customer by sending a signal to a wash tunnel controller, and wherein the wash tunnel controller is configured to send commands to wash equipment.

13. The system of claim 1, wherein the second sign is not provided on an electronic device.

14. The system of claim 1, wherein the first graphical code is configured to be scanned by the mobile device to open the application on the mobile device.

15. The system of claim 1, further comprising the mobile device.

16. A non-transitory computer readable medium having stored thereon software instructions that, when executed by a processor, cause the processor to:
 send and receive signals with an application on a mobile device in response to a first graphical code on a first sign being scanned by the mobile device, wherein the mobile device is not a fixed, physical terminal;
 receive a first input regarding a customer selection that has been input at the mobile device, wherein the customer selection includes a desired property of a wash;
 cause a message to be sent to a controller to indicate the customer selection;
 receive a location indication of the mobile device in response to a second graphical code on a second sign provided in front of a gate at an entrance of a wash tunnel being scanned by the mobile device, wherein the second sign is not configured to receive any input from a customer;
 provide commands to wash equipment in the wash tunnel to initiate the wash based on the desired Property of the wash and the location indication;
 cause a message to be sent to the controller to indicate a location of the mobile device based on receipt of the location indication; and
 cause the gate to open and cause activation of wash equipment based on receipt of the location indication, wherein the wash equipment is operated based on the customer selection.

17. The non-transitory computer readable medium of claim 16, wherein the location indication of the mobile device indicates a relative position of a customer within a queue.

18. The non-transitory computer readable medium of claim 16, wherein the second graphical code is a QR code.

19. The non-transitory computer readable medium of claim 16, wherein the second graphical code is deployed in a car wash environment where two or more physical queues of cars are required to merge into a single physical queue of cars, the two or more Physical queues of cars including a first queue, the first sign comprising the first graphical code is positioned adjacent to the first queue, the first graphical code being configured to be scanned to indicate a location of the mobile device in the first queue, the second sign comprising the second graphical code is positioned adjacent to the single physical queue of cars, and the second graphical code is configured to be scanned to indicate a correct order of cars in the single physical queue of cars.

20. The non-transitory computer readable medium of claim 16, wherein the second sign is not provided on an electronic device.

21. The non-transitory computer readable medium of claim 16, wherein scanning of the first graphical code on the first sign by the mobile device causes the application to open on the mobile device.

* * * * *